United States Patent [19]

VanManen

[11] 4,318,764
[45] Mar. 9, 1982

[54] METHOD OF EXTRUSION/INJECTION MOLDING OF TRIMMED PRODUCT

[75] Inventor: Dick T. VanManen, Canandaigua, N.Y.

[73] Assignee: Voplex Corporation, Pittsford, N.Y.

[21] Appl. No.: 146,793

[22] Filed: May 5, 1980

[51] Int. Cl.³ .............................................. B29D 7/08
[52] U.S. Cl. ........................ 156/244.11; 156/244.12; 156/245; 264/167; 264/177 R; 264/259; 264/271.1; 264/274; 264/328.1
[58] Field of Search ................... 156/242, 243, 244.11, 156/244.12, 244.15, 245; 264/167, 176 R, 177 R, 259, 210.1, 271, 274, 275, 279, 328.1; 428/46, 67

[56] References Cited

U.S. PATENT DOCUMENTS

| | | | |
|---|---|---|---|
| 236,383 | 1/1881 | Waldect | 428/46 |
| 1,137,127 | 4/1915 | Gammeter | 156/245 |
| 1,880,697 | 10/1932 | Beynon | 156/242 |
| 2,156,754 | 5/1939 | Evans et al. | 156/245 |
| 3,068,136 | 12/1962 | Reid | 156/244.11 |
| 3,136,676 | 6/1964 | Fisch | 156/244.12 |
| 3,223,056 | 12/1965 | Wilburn | 156/242 |
| 3,312,197 | 4/1967 | Smith | 428/67 |
| 3,363,039 | 1/1968 | Nagai et al. | 264/328.1 |
| 3,440,129 | 4/1969 | Anselm | 156/244.12 |
| 3,458,386 | 7/1969 | Shanok et al. | 156/209 |
| 3,510,551 | 5/1970 | McCrea | 264/250 |
| 3,654,062 | 4/1972 | Loew | 156/245 |
| 3,811,989 | 5/1974 | Hearn | 156/244.12 |
| 3,843,475 | 10/1974 | Kent | 156/244.11 |
| 4,081,504 | 3/1978 | Wenack et al. | 264/177 R |
| 4,183,778 | 1/1980 | Mesnel | 156/245 |

Primary Examiner—Caleb Weston
Attorney, Agent, or Firm—Stonebraker, Shepard & Stephens

[57] ABSTRACT

A method for molding a product 20 bearing a trim strip 14 first extrudes a supporting base 12 and bonds trim strip 14 to supporting base 12. Then the supporting base 12 is used to position and protect trim strip 14 within a mold 18 where product 20 is formed. Product 20 and supporting base 12 are formed of resin materials that bond together securely as the product is injection molded within mold 18.

10 Claims, 11 Drawing Figures

METHOD OF EXTRUSION/INJECTION MOLDING OF TRIMMED PRODUCT

BACKGROUND

Trim strips are applied to automotive and other products to improve appearance. Available trim strip material, and especially metallized strips simulating polished metal, are formed on relatively flimsy polyester backing strips that must be bonded to supporting bases and often covered with protective coatings. Often, trim strips are mounted with adhesives that delaminate after awhile so that the trim strips come loose. Positioning the trim strips within an injection mold cavity for the final product has failed because the temperatures, pressures, movements, and stresses that occur within the mold cavity dislodge or damage the trim strip and spoil the result.

My invention solves these problems with a two-step process that first combines the decorative trim strip with an extrusion and then uses the extrusion to position and protect the trim strip within an injection mold where the final product is formed. By properly selecting materials, the trim strip is effectively mounted in place with a secure bond that will not delaminate during the working life of the product. The process is also economical and efficient and leads to a better result at a lower cost.

SUMMARY OF THE INVENTION

My inventive method forms a molded product bearing a trim strip. I extrude a supporting base for the trip strip and bond the trim strip to the supporting base. Then I use the supporting base to position and protect the trim strip within a mold where I injection mold the product. I form the product and supporting base of resin materials that bond together during the injection molding.

DRAWINGS

DETAILED DESCRIPTION

My invention uses extrusion technology to form a supporting base for a decorative trim strip, and I give the base the proper dimensions and characteristics so that it can position and protect the trim strip within an injection mold where the trimmed product is made.

It is relatively easy to bond trim strips to extrusions by pressing a trim strip material against a freshly extruded supporting base, hot stamping a trim strip to an extrusion, combining the trim strip with a cross head extrusion, or sandwiching a trim strip between extruded layers. Since trim strip material is available in indefinite linear lengths and extrusions maintain a uniform cross section for indefinite lengths, the two can be combined without difficulty.

If the supporting base is given the proper dimensions and contours and is formed of proper materials, it can be positioned accurately within an injection mold cavity and held in place during injection molding. The mold cavity is shaped to receive and hold the contoured supporting base; and the material of the supporting base not only locates the trim strip, but protects it from damage from heat, errosion, and material flow during injection molding. A cut-off length of an extruded supporting base bearing a trim strip can also be bent or shaped to fit within a positioning recess in an injection mold cavity to follow the surface contours of many different shapes for the final product.

Selecting proper resin materials for the supporting base and the injection molded product can produce a secure bond between the two without damage or detriment to either component. This can make the trim strips secure and long lasting and can also secure them in place cheaply and efficiently compared to present alternatives.

Figure 1:
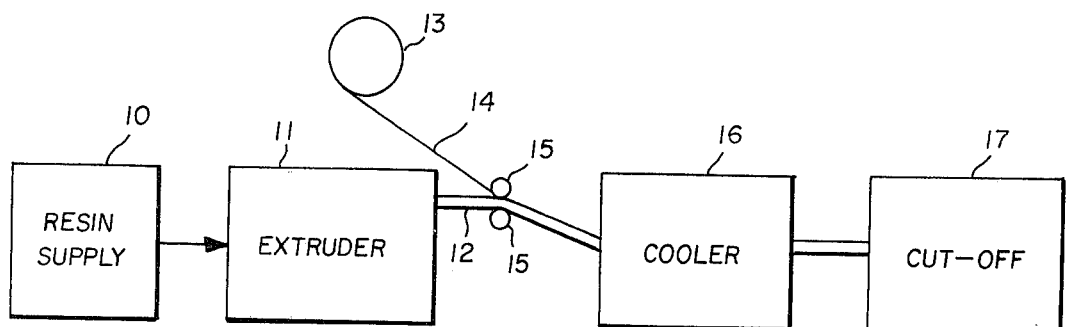
FIG. 1 is a schematic diagram of preferred steps in my inventive method.

Preferred steps in my inventive method are schematically illustrated in FIG. 1 beginning with a resin supply 10 feeding an extruder 11 that forms a supporting base 12. A supply reel 13 feeds a trim strip 14 into engagement with supporting base 12 so that the two can be bonded together by pressure rollers 15. Cooler 16 then cools the trimmed extrusion, which passes to a cut-off machine 17 for cutting the extrusion into suitable lengths. These are positioned within an injection mold 18 supplied with another resin from supply 19 to produce the extrusion and injection molded trimmed product 20.

There are many different ways that are already known for applying a trim strip to an extrusion; and although this is conveniently done as the extrusion is formed, it can also be accomplished later. Suitable trim strip materials and resins for forming supporting bases are also generally known in the art. The supporting base can be an opaque material behind the back face of the trim strip or a clear material over the front face of the trim strip, or both.

Supporting base 12 preferably has a substantially larger cross-sectional area than decorative trim strip 14 to provide both mass and a suitable contour for locating and protecting the trim strip during injection molding. A multitude of shapes are possible and can be devised to accommodate mold cavities and molded products for different purposes.

Figure 2:
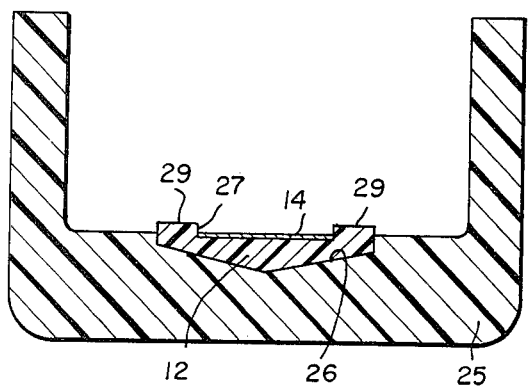
FIG. 2 is a partially schematic cross-sectional view of a mold part shaped to hold a trim strip and form a product according to my invention.

One simple possibility is shown in FIG. 2 where a supporting base 12 is contoured to fit in a recess 26 in a mold cavity 25 for injection molding an automobile bumper. Supporting base 12 also has a recess 27 carrying a decorative trim strip 14 that is visible through the clear resin material of support base 12. On opposite sides of recess 27 are raised surfaces 29 that partially melt and form a bonded interface with injection molded resin formed within the mold against surfaces 29. This mounts support base 12 and trim strip 14 securely in place on the molded bumper. Another mold part (not shown) cooperates with mold part 25 in a generally known way and is omitted to simplify the illustration.

Figure 3:
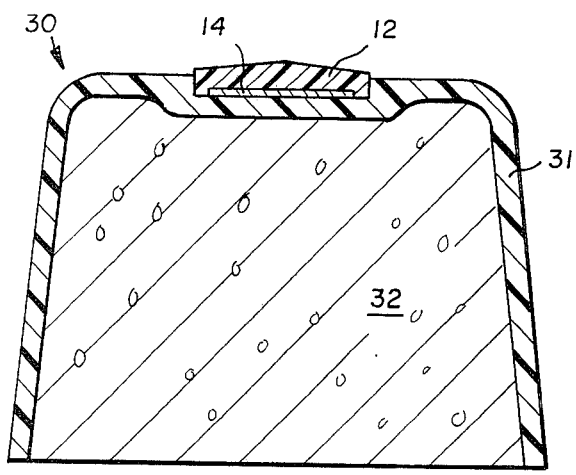
FIG. 3 is a cross-sectional view of a molded automotive bumper having a trim strip according to my invention.

A cross section of a molded resin bumper 30 made from the mold cavity of FIG. 2 is shown in FIG. 3. It includes a tough resinous shell 31 formed by injection molding or reaction injection molding, with trim strip 14 and its clear supporting base 12 bonded to the front face of bumper 30 for decorative purposes. A foamed resin 32 can fill and support shell 31 after the injection molding step if desired.

Figure 4:
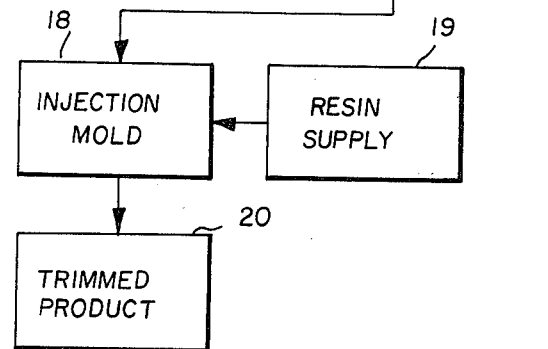
FIGS. 4-6 are cross-sectional views of preferred alternatives for products made according to my invention.
Figure 5:
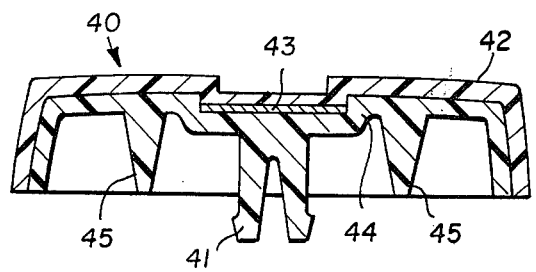
Figure 6:
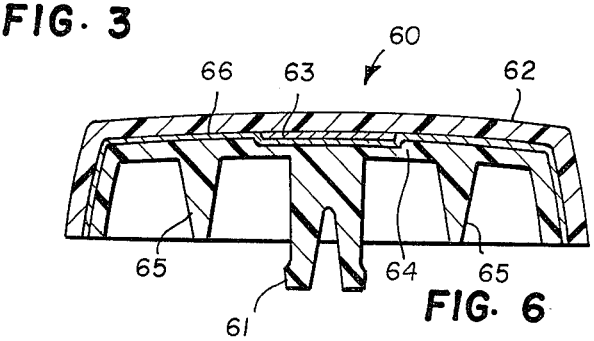

Extrusion and injection molded products 40, 50, and 60 shown respectively in FIGS. 4, 5, and 6 are all similar in having molded projections 41, 51, and 61 for mounting in holes formed in bodies or bumpers for automotive trim purposes. Product 40 has a clear extrusion 42 extending around both side edges and across the entire front face and a hot stamped or laminated trim strip 43 extending along the central region of the front face and visible through the clear extrusion 42 that forms a supporting base. Extrusion 42 also locates trim strip 43 accurately and securely within a mold cavity in which body 44 is injection molded. Body 44 is preferably formed of opaque resin material extending in back of trim strip 43 and visible through the side portions of clear extrusion 42. Injection molded body 44 includes strengthening ribs 45 and mounting projections 41 that can snap into receiving holes to mount product 40 in place.

Product 50 is similar to product 40 except that clear extrusion 52 does not extend around side edges, which are formed solely by molded body 54 extending behind decorative strip 53. Body 54 includes strengthening ribs 55 and mounting projections 51.

Product 60 has one trim strip material 63 positioned in a central region where it is visible through clear supporting base extrusion 62 and is formed by a hot stamped or laminated material. In addition to this, a metallized layer formed as a metallized trim strip 66 extends for the full width of clear extrusion 62 and is backed up by injection molded body 64. Metallized layer 66 provides a polished metallic appearance visible through clear extrusion 62 throughout the width of molded product 60, and trim strip 63 forms a contrasting colored strip along the center line of product 60. Base 64 includes strengthening ribs 65 and mounting projections 61.

Figure 7:
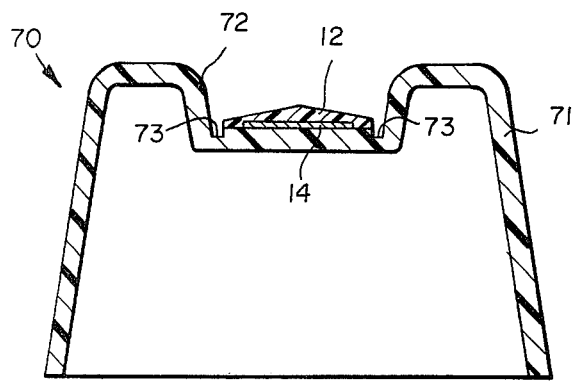
FIGS. 7 and 8 are cross-sectional views of alternative molded bumpers made according to my invention.

A cross section of an injection molded bumper 70 having a different contour is shown in FIG. 7. Supporting base 12 of clear resinous material bearing trim strip 14 is arranged within a forward facing recess 72 in injection molded bumper shell 71. Locator grooves 73 formed along the edges of supporting base 12 help locate it in position during the injection molding step. Shell 71 can also be filled with foamed resin after injection molding.

Figure 8:
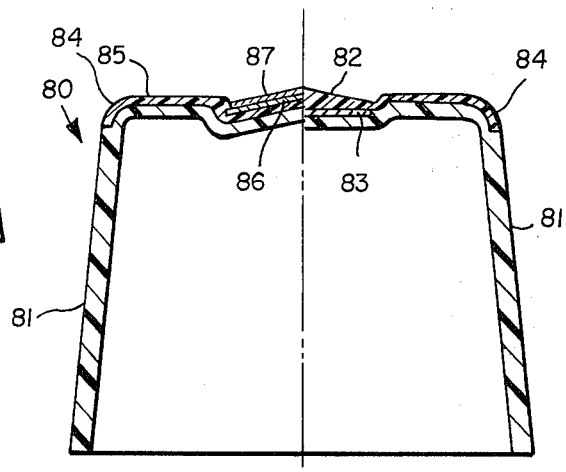

The cross section of molded bumper 80 as shown in FIG. 8 includes an injection molded shell 81 and illustrates two more alternative preferred embodiments. To the right of the center line, clear extrusion 82 supports a decorative trim strip 83 and extends to the corner 84 of bumper shell 81. On the left side of the center line, a colored extrusion 85 provides a decorative outer surface for bumper 80 and bears a contrasting trim strip 86 on its outer surface visible through an optional clear laminate 87 that can be formed as part of the extrusion. Forming extrusions as trim strips supporting bases wide enough to extend to the corners of bumper shells affords a large surface area for locating the extrusions within an injection mold cavity and supplies a very secure bond to the bumper shell. It also allows greater variation in decorating and enhancing the appearance of a bumper.

Figure 9:
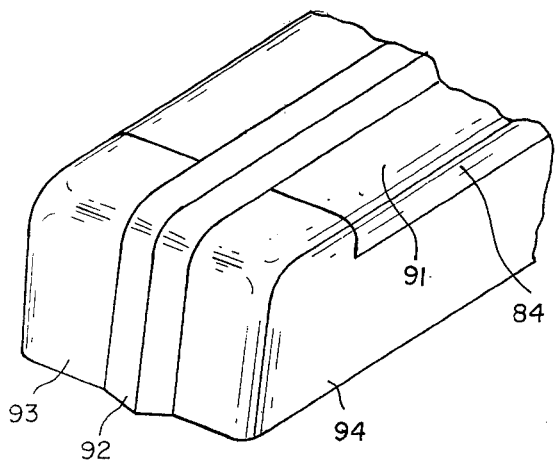
FIGS. 9-11 are perspective views of preferred alternatives for molded corners for automotive bumpers made according to my invention.
Figure 10:
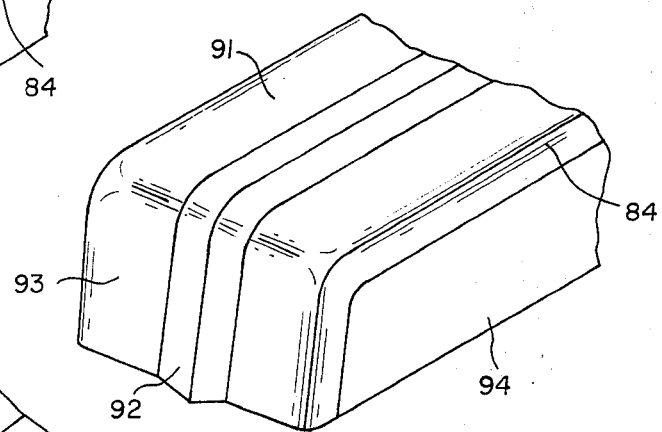
Figure 11:
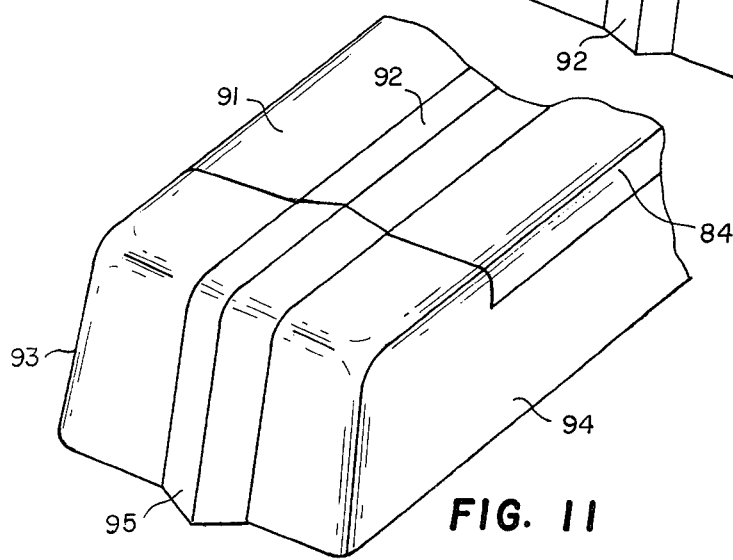

Using relatively wide extrusions extending to bumper corners 84 as shown in FIG. 8 can be integrated into the wrap-around portions of bumpers in several ways as shown in FIGS. 9-11. In the embodiment of FIG. 9, corners are cut out of the extruded supporting base 91 leaving only central region 92 bearing a trim strip to extend into the wrap-around portion 93 of molded bumper shell 94. Shading identifies the surface of bumper shell 94 as distinguished from extrusion 91.

In the embodiment of FIG. 10, the entire decorative extrusion 91 is bent to fit the bumper wrap-around 93 and extends trim strip 92 around the ends of injection molded bumper shell 94. In the embodiment of FIG. 11, extrusion 91 is cut off to be limited to the forward face of the bumper; and the wrap-around portion 93 of bumper shell 94 has a contour 95 that extends the contour of the trim strip portion 92 of extrusion 91.

The illustrated embodiments show that many variations of the invention are possible. Many different colors of resins and trim strips, different numbers of trim strips, and different configurations of extruded supporting bases and trim strip lines can be molded into a wide variety of products according to my invention.

I claim:

1. A method of molding a product bearing a trim strip, said method comprising:
   a. extruding a supporting base for said trim strip;
   b. configuring said supporting base to have a substantially larger cross-sectional area than said trim strip and a mass and contour suitable for positioning within an injection mold cavity;
   c. combining said trim strip with said supporting base;
   d. using said contour of said supporting base to fit said supporting base against a corresponding contour within said mold cavity so that said supporting base positions and protects said trim strip within said mold cavity;
   e. injection molding said product within said mold cavity; and
   f. forming said product and said supporting base of resin materials that bond together during said injection molding step.

2. The method of claim 1 including forming said supporting base with side edges that engage said mold and position said supporting base and said trim strip within said mold.

3. The method of claim 1 including forming said supporting base with an opaque resin material behind said trim strip.

4. The method of claim 3 including forming said supporting base with a clear resin material covering the front face of said trim strip.

5. The method of claim 1 including hot stamping said trim strip to said supporting base.

6. The method of claim 1 including combining said trim strip in a cross head extrusion of said supporting base.

7. The method of claim 1 including forming said product with attachment projections for mounting said product on a structure.

8. The method of claim 1 including forming said molded product as an automobile bumper.

9. The method of claim 8 including bending said supporting base and said trim strip to follow curved ends of said bumper.

10. The method of claim 8 including forming said bumper as an injection molded shell bearing said supporting base and said trim strip and then filling said shell with a foamed resin material.

* * * * *